United States Patent
Gaertner et al.

(10) Patent No.: US 9,221,320 B2
(45) Date of Patent: Dec. 29, 2015

(54) METHODS AND SYSTEMS FOR SHADING A WINDOW

(71) Applicants: Brent Nathaniel Gaertner, Cable, OH (US); John Anthony Horan, Marysville, OH (US)

(72) Inventors: Brent Nathaniel Gaertner, Cable, OH (US); John Anthony Horan, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 14/030,599

(22) Filed: Sep. 18, 2013

(65) Prior Publication Data

US 2015/0075737 A1    Mar. 19, 2015

(51) Int. Cl.
   *B60J 7/00*    (2006.01)

(52) U.S. Cl.
   CPC .................... *B60J 7/0015* (2013.01)

(58) Field of Classification Search
   USPC ............ 160/370.22, 120, 122, 241, 243, 244, 160/DIG. 7; 296/219
   IPC ..................................... B60J 7/0015
   See application file for complete search history.

(56) References Cited

U.S. PATENT DOCUMENTS

| | | | | |
|---|---|---|---|---|
| 3,065,785 | A * | 11/1962 | Taber | 160/81 |
| 3,236,290 | A * | 2/1966 | Lueder | 160/241 |
| 3,693,695 | A * | 9/1972 | Deane | 160/243 |
| 4,247,599 | A * | 1/1981 | Hopper | 428/458 |
| 4,359,081 | A * | 11/1982 | Brower | 160/243 |
| 4,766,941 | A | 8/1988 | Sloop et al. | |
| 6,186,211 | B1 | 2/2001 | Knowles | |
| 6,520,569 | B2 * | 2/2003 | Wingen et al. | 296/214 |
| 6,682,133 | B2 * | 1/2004 | Glasl | 296/216.01 |
| 6,915,988 | B2 | 7/2005 | Sanz et al. | |
| 7,469,960 | B2 * | 12/2008 | Koelbl et al. | 296/214 |
| 7,690,414 | B2 | 4/2010 | Knowles | |
| 2006/0082182 | A1 | 4/2006 | Saberan et al. | |
| 2012/0061029 | A1 * | 3/2012 | Weston | 160/6 |
| 2012/0139284 | A1 * | 6/2012 | Lee | 296/97.4 |

FOREIGN PATENT DOCUMENTS

JP    2008007058 A    1/2008

* cited by examiner

*Primary Examiner* — David Purol
(74) *Attorney, Agent, or Firm* — Armstrong Teasdale LLP

(57) ABSTRACT

A window shade system is provided. The system includes a frame coupleable adjacent to a window. The frame includes first and second side members. At least two shade roll assemblies are coupled to the frame. The at least two shade roll assemblies are selectively movable along the first and second side members independently of each other. A shade member is coupled to the at least two shade roll assemblies. In addition, the shade member is selectively variably permeable to light.

18 Claims, 8 Drawing Sheets

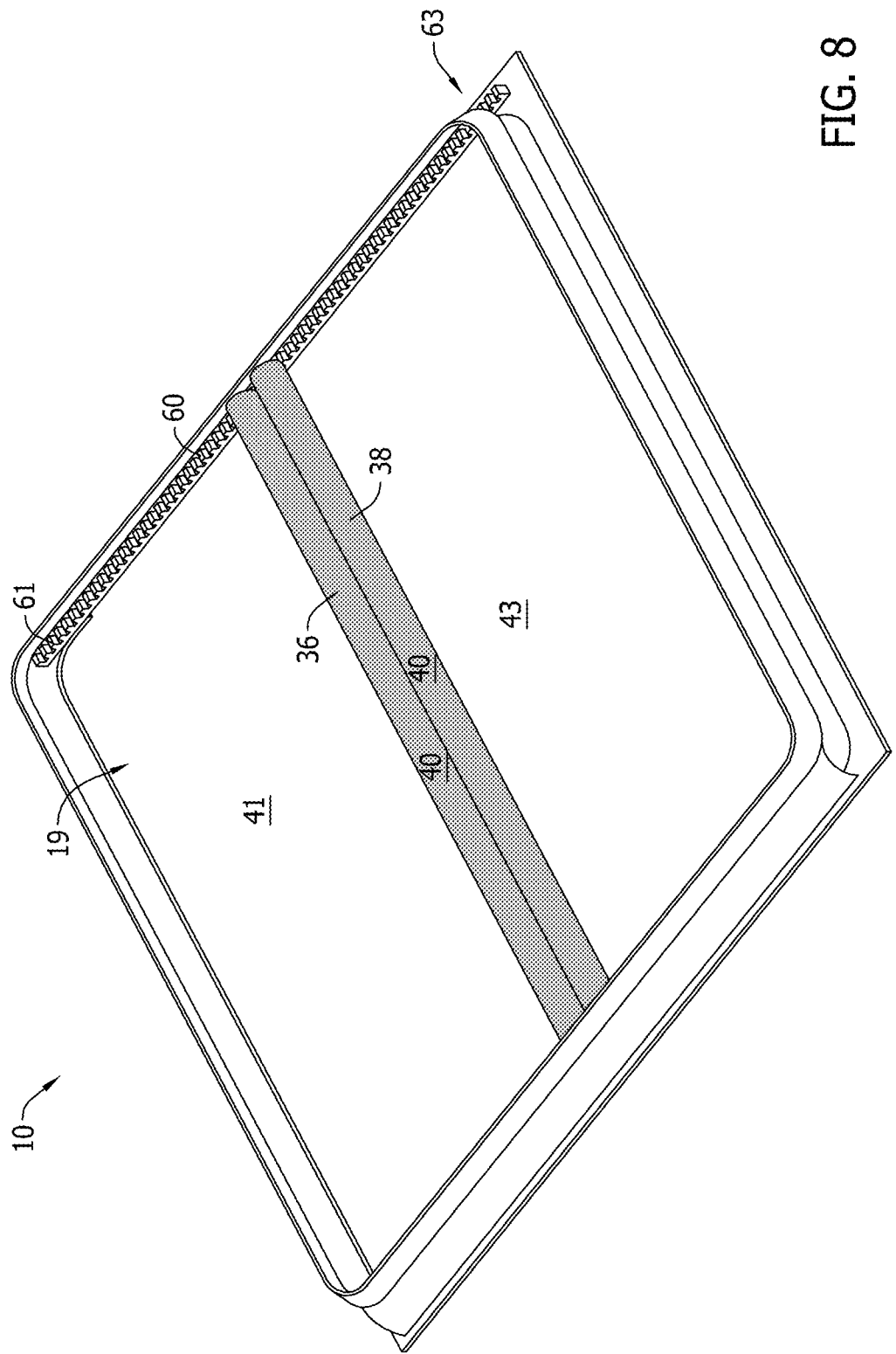

METHODS AND SYSTEMS FOR SHADING A WINDOW

BACKGROUND

The present disclosure relates generally to systems for shading windows, and more specifically, to variable light transmission shade systems for use in vehicles.

At least some known vehicles include shade systems that cooperate with the vehicle windows. For example, in some vehicles, the window is a roof window that is fixed or that is movable (sometimes referred to as a "sunroof" or a "moonroof"). In some vehicles, the shade system is manually actuated. In other vehicles, the shade system is power-driven, and may be actuated through a control interface device accessible within the passenger compartment of the vehicle.

At least some known shade systems include an assembly that is mounted between the roof-mounted window and the passenger compartment. The shade system includes two side rails, and a pair of cross members. A shade member is secured at a first end to a shade roll, for sliding movement back and forth along the side rails, and is secured at a second end to the first cross member. A drive system moves the shade roll along the slide rails to selectively move the shade roll away from the first cross member and towards the second cross member, thus causing the shade member to be unrolled from the shade roll. A tension or retractor spring is coupled to the shade roll to retract the shade roll towards the first cross member, and to cause the shade member to be rolled up on the shade roll. The tension spring also maintains tension in the shade member, after the shade roll has moved to a predetermined position. Because the shade roll is pushed or pulled by the drive system, noise and/or vibration may be created during operation as the shade roll is forced to overcome sliding friction while moving along the side rails. In addition, such shade systems are often only positionable either open or fully closed.

In at least some known shade systems, the shade member is typically one of two types. The first type of shade member uses a light blocking fabric to substantially prevent all light from passing through. The second type of shade member is a mesh layer that allows a predetermined amount (e.g., typically less than five percent) of the total light striking the shade member to pass therethrough. Neither of these types of shade member has variable light permeability, such that the amount of light allowed to pass through the shade member is fixed.

BRIEF DESCRIPTION

In one embodiment, a shade system is provided. The shade system includes a frame coupleable adjacent to a window. The frame includes first and second side members. The shade system also includes at least one shade roll assembly that is coupled to the frame and is selectively movable along the first and second side members. The shade system also includes a shade member that is coupled to the at least one shade roll assembly and is selectively variably permeable to light.

In another embodiment, a method for shading a window is provided. The method includes selectively moving at least one of a first and a second shade roll assembly from a first position to a second position along first and second sides of a frame coupled adjacent to the window. The first and second shade roll assemblies are coupled to opposed respective first and second ends of a shade member and are movable independently of each other. The method also includes selectively applying an amount of tension to the shade member, wherein the shade member is variably permeable to light depending on the amount of tension on the shade member.

The features, functions, and advantages that are discussed can be achieved independently in various embodiments or may be combined in yet other embodiments, further details of which can be seen with reference to the following description and drawings.

BRIEF DESCRIPTION OF THE DRAWINGS

FIG. 8 is a perspective view of the shade system shown in FIG. 2, and illustrating a further exemplary operational orientation.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

In some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Figure 1:
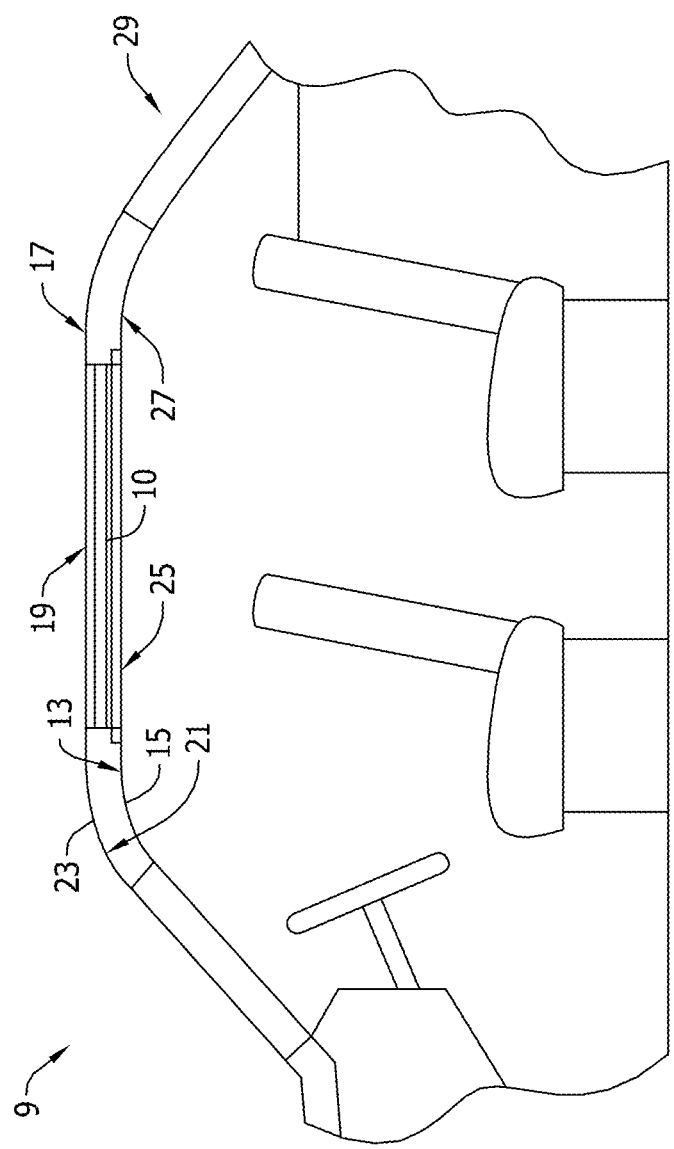
FIG. 1 is a sectional view of an exemplary vehicle including an exemplary variable light transmitting shade system.

FIG. 1 is a schematic sectional view of a vehicle 9 that includes an exemplary variable light transmission shade system 10. In the exemplary embodiment, shade system 10 is coupled to a roof 17 of vehicle 9, and is adjacent to a roof-mounted outer window 19. Specifically, system 10 is coupled to an upper surface 13 of an inner wall 15 of roof 17. In another embodiment, shade system 10 is coupled to a lower surface 21 of an outer wall 23 of roof 17. In one embodiment, shade system 10 is positioned between outer window 19, and a second inner window 25 that is substantially flush with an interior surface 27 of roof 17. In an alternative embodiment, shade system 10 is used with a window oriented at a location other than in roof 17, such as adjacent a rear window 29. Alternatively, shade system 10 may be used with a window oriented at any location on vehicle 9. Although described herein as included within vehicle 9, shade system 10 may be included within houses, commercial buildings, and/or any other structures where variable shading of windows is desired.

Figure 2:
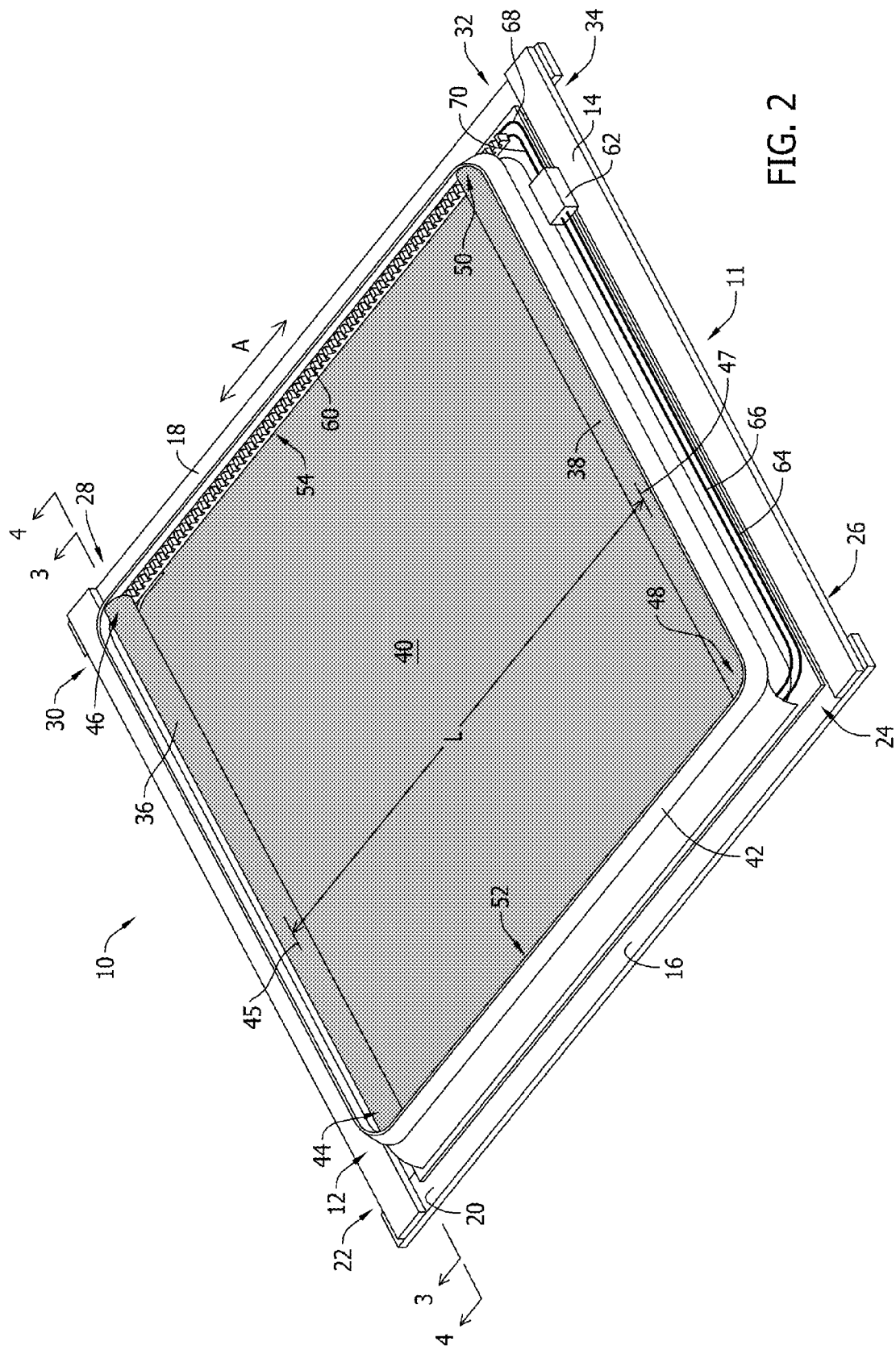
FIG. 2 is a perspective view of an exemplary variable light transmission shade system that may be used in the vehicle shown in FIG. 1.

FIG. 2 is a perspective view of exemplary variable light transmission shade system 10 shown in FIG. 1). In the exemplary embodiment, shade system 10 includes a frame 11 for coupling system 10 to vehicle 9. Frame 11 includes a first cross member 12, a second cross member 14, a first side member 16, and a second side member 18. A first end 20 of first side member 16 is coupled to a first end 22 of first cross member 12. A second end 24 of first side member 16 is coupled to a first end 26 of second cross member 14. Similarly, a first end 28 of second side member 18 is coupled to a second end 30 of first cross member 12, and a second end 32 of second side member 18 is coupled to a second end 34 of second cross member 14. In the exemplary embodiment, first cross member 12, second cross member 14, first side member 16, and second side member 18 are fabricated from steel or aluminum; however, they may be fabricated from any suitable materials that enable shade system 10 to function as described herein. Furthermore, although illustrated as four separate components coupled to form frame 11, in alternative embodiments, frame 11 may be fabricated as a single piece, or may have any suitable configuration that enables system 10 to function as described herein.

In the exemplary embodiment, system 10 includes a first shade roll assembly 36 and a second shade roll assembly 38. Each assembly 36 and 38 is selectively movable relative to side members 16 and 18, along the direction of arrow A, as described in further detail below. First shade roll assembly 36 is coupled to a first end (not shown) of a shade member 40, and second shade roll assembly 38 is coupled to an opposite second end (not shown) of shade member 40.

In the exemplary embodiment, shade member 40 is fabricated from a material that has a variable light transmission property. More specifically, shade member 40 is fabricated from a material that exhibits a first level of light permeability when subjected to a first amount of tension, and exhibits at least a second, specifically, different level of light permeability when subjected to a second amount of tension. In the exemplary embodiment, when shade member 40 is subjected to an amount of tension that is below a predetermined value and that is in the direction of arrow A, shade member 40 substantially blocks transmission of light therethrough. When shade member 40 is subjected to an amount of tension that is above the predetermined value, shade member 40 is stretched and becomes translucent, permitting a predetermined amount of light striking shade member 40 to pass therethrough. Moreover, in the exemplary embodiment, the light permeability of shade member 40 is variable at all locations along its length L as measured for example between locations 45 and 47. Shade member 40 may be fabricated from any material that enables system 10 to function as described herein, such as, but not limited to, a stretchable mesh material. Alternatively, for example, shade member 40 may be fabricated from any material that becomes less permeable to light with increased applied tension. In the exemplary embodiment, system 10 also includes a cover member 42 coupled to frame 11. Cover member 42 encloses ends 44 and 46 of first shade roll assembly 36, ends 48 and 50 of second shade roll assembly 38, and side edge areas 52 and 54 of shade member 40.

In the exemplary embodiment, first shade roll assembly 36 and second shade roll assembly 38 are independently movable along side members 16 and 18. Moreover, each shade roll assembly 36 and 38 is independently and selectively rotatable in-place to increase or decrease tension in shade member 40. Each shade roll assembly 36 and 38 is coupled to a rack 60 oriented on side member 18 to cause a corresponding shade roll assembly 36 and/or shade roll assembly 38 to be selectively moved relative to side members 16 and 18.

Power and control of shade roll assemblies 36 and 38 is provided by a control unit 62. In the exemplary embodiment, control unit 62 is coupled to, and positioned within a footprint of, frame 11. Control unit 62 has any suitable configuration that enables system 10 to function as described herein. For example, control unit 62 may include, but is not limited to, a programmable or pre-programmed processor coupled to a memory device (not shown). Control unit 62 is coupled to shade roll assemblies 36 and 38 via power and control transmission members 64 and 66, and 68 and 70. Control unit 62 is coupled to one or more control interface devices (not shown) located within vehicle 9 (shown in FIG. 1). In the exemplary embodiment, control unit 62 is suitably configured, using known programming techniques, to provide control signals to shade roll assemblies 36 and/or 38 to cause selective movement of shade roll assemblies 36 and/or 38 as described herein. In addition, each shade roll assembly 36 and 38 is also capable of rotating in place to either increase or decrease tension in shade member 40. In the exemplary embodiment, shade roll assemblies 36 and 38 translate and/or rotate in concert, or separately, and independently from each other, depending upon a desired configuration of system 10, as described in further detail herein.

Figure 3:
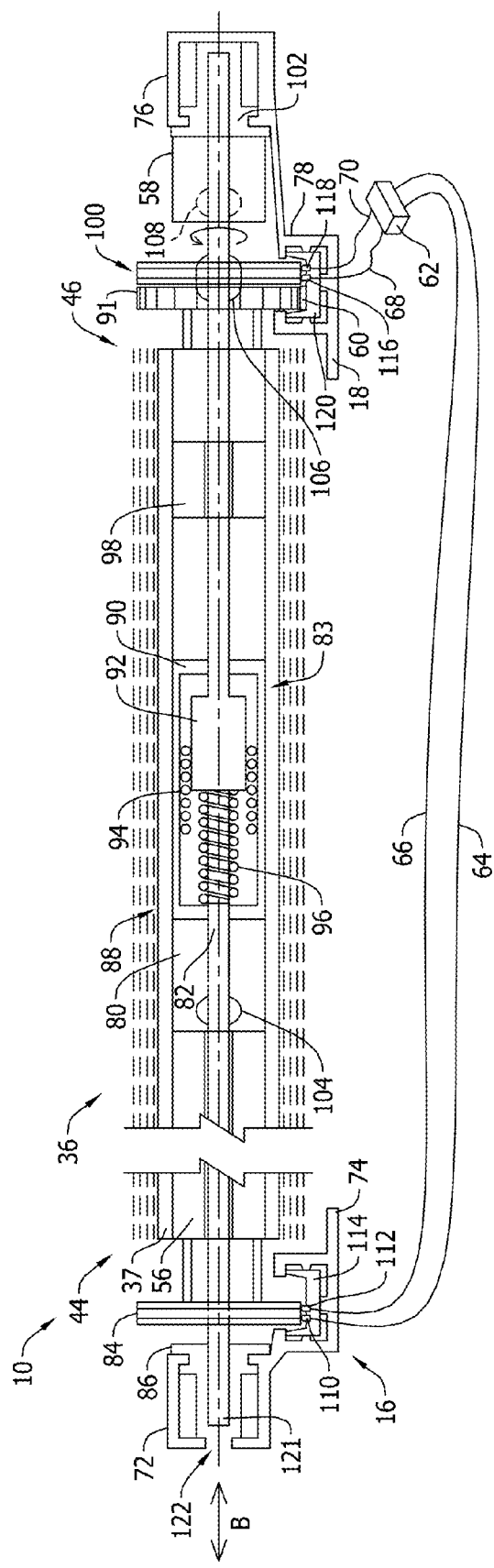
FIG. 3 is a sectional view taken along line 3-3 of FIG. 2, of an exemplary shade roll assembly that may be used with the variable light transmission shade system shown in FIG. 1, showing a first orientation of the shade roll assembly.
Figure 4:
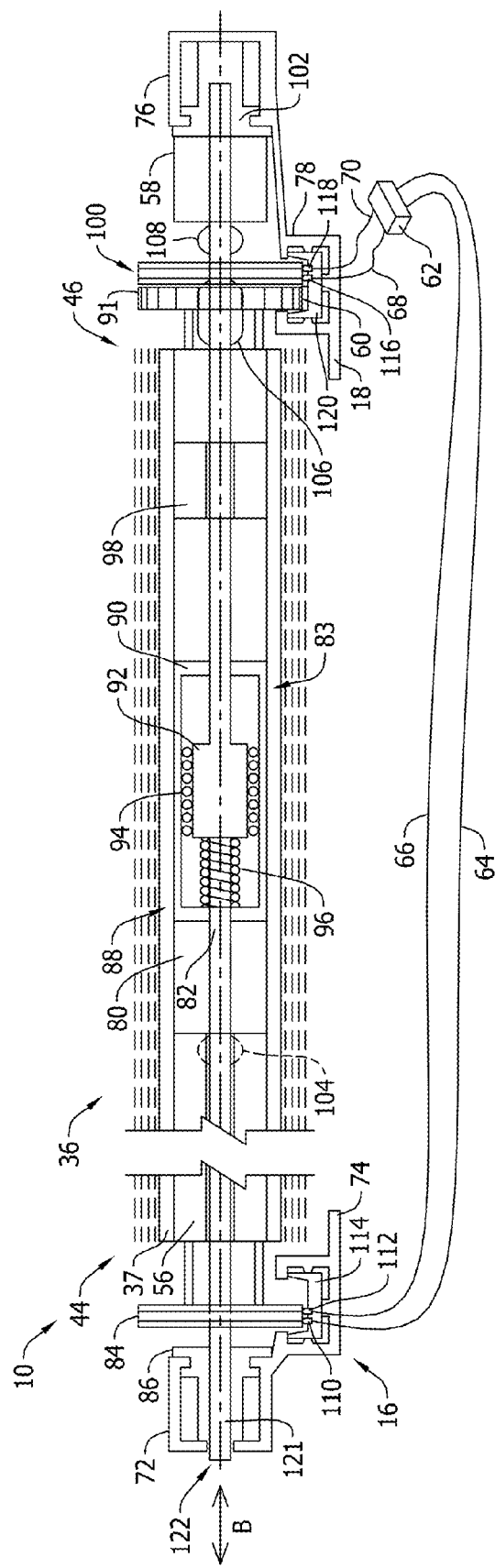
FIG. 4 is a sectional view taken along line 4-4 of FIG. 2, of an exemplary shade roll assembly that may be used with the variable light transmission shade system shown in FIG. 1, showing a second orientation of the shade roll assembly.

FIGS. 3 and 4 are schematic sectional views of exemplary shade system 10, taken along lines 3-3 and 4-4, respectively, in FIG. 2. More specifically, FIG. 3 shows first shade roll assembly 36 in a roll drive orientation, relative to side members 16 and 18, and FIG. 4 shows first shade roll assembly 36 in a shade member tensioning orientation. First shade roll assembly 36 includes a cylindrical hollow tube 37 that defines a cavity 80 therein. Assembly 36 also includes a solenoid 88 at a location 83 within cavity 80 and coupled to tube 37. Solenoid 88 is coupled to a shaft 82, as described in further detail hereinbelow. First shade roll assembly 36 also includes a shade tension motor 56 within cavity 80 that is coupled to shaft 82. First shade roll assembly 36 also includes a roll position motor 58 that is coupled to side member 18, such that roll position motor 58 is selectively rotationally coupleable to tube 37 as described in more detail hereinbelow. Assembly 36 also includes a gear 91 that is selectively coupleable to shaft 82, and a slide bushing 86 that is slidably coupled to shaft 82.

Side member 16 includes a slide channel structure 72 and a power channel structure 74. Similarly, side member 18 includes a slide channel structure 76 and a power channel structure 78. In the exemplary embodiment, slide channel structures 72 and 76, and power channel structures 74 and 78 extend substantially from respective first ends 20, 28 to respective second ends 24, 32 of side members 16 and 18 (all shown in FIG. 2). Rack 60 is positioned within power channel structure 78 and extends substantially from first end 28 to second end 32. In the exemplary embodiment, a plurality of apertures 122 is provided along slide channel structure 72, corresponding to a plurality of predetermined locations along side members 16, 18, to which shade roll assembly 36 can be moved.

Shade tension motor 56 is oriented within an end 44 of tube 37 and is rotationally coupled with tube 37. Shaft 82 extends through motor 56. As used herein, "rotationally coupled" means that a first component (or a portion thereof) is coupled to a second component (or portion thereof), such that the first and second components (or respective portions thereof) rotate together as a unit. Accordingly, in the exemplary embodiment, a first portion (e.g., a winding—not shown) of motor 56 is coupled for rotation with tube 37, while a second portion (e.g., a rotor—not shown) of motor 56 can rotate relative to the second portion of motor 56 and to tube 37 during operation of motor 56. In the exemplary embodiment, shaft 82 is slidable relative to motor 56, and may be coupled for rotation with the rotor portion of motor 56, or de-coupled from the rotor portion of motor 56, to enable shaft 82 to rotate independently of motor 56, as described in further detail hereinbelow. Shaft 82 also extends through, and is rotationally coupled to, an electrical trace member 84. As described herein, a slide bushing 86 is slidably coupled to slide channel structure 72. In addition, slide bushing 86 enables shaft 82 to move laterally, relative to slide channel structure 72, in the direction indicated by arrow B. Slide bushing 86 may be fabricated from any suitable material that enables system 10 to function as described herein.

In the exemplary embodiment, solenoid 88 is coupled to shaft 82 and tube 37 at location 83 between shaft ends 44 and 46 of shade roll assembly 36. Solenoid 88 includes a housing 90. In the exemplary embodiment, armature 92 is secured to shaft 82, and housing 90 is secured to tube 37. An electrically-energizable coil 94 surrounds armature 92. A spring member 96 surrounds shaft 82 and is oriented between armature 92 and housing 90. In the roll drive orientation shown in FIG. 3, coil 94 is electrically de-energized. Spring 96 presses against armature 92, pushing armature 92 and shaft 82 toward side member 18. In an alternative embodiment (not shown), solenoid 88 is coupled to shaft 82 such that energization of solenoid 88 causes movement of shaft 82 in a direction opposite to that shown in FIG. 3.

Assembly of system 10 also includes coupling a bushing 98 to shaft 82 to rotatably support end 46 of tube 37 relative to shaft 82. In the exemplary embodiment, shaft 82 extends through and is selectively coupled to gear 91, which engages toothed rack 60. In the exemplary embodiment, gear 91 and rack 60 are fabricated from any suitable materials that enable gear 91 to rotate along rack 60 while producing little sound. An electrical trace member 100 is rotationally coupled and is axially slidable relative to shaft 82. Roll position motor 58 is slidably coupled to slide channel structure 76 via a slide bushing portion 102 similar to slide bushing 86. Shaft 82 is laterally slidable in the direction of arrow B, and is selectively coupled to roll position motor 58. In the exemplary embodiment, slide bushing portion 102 and bushing 86 are fabricated from a low-friction material that facilitates reducing noise and vibration during movement of shade roll assembly 36.

Tabs 104, 106, and 108 are oriented along shaft 82 to selectively couple with motor 56, gear 91 and motor 58 via slots (not shown) into which tabs 104, 106, and 108 are selectively inserted when shaft 82 is moved laterally. In the roll drive configuration shown in FIG. 3, tabs 106 and 108 are inserted into the slots within gear 91 and motor 58, respectively, while tabs 104 are outside of motor 56. Rotation of motor 58 rotates gear 91 which, in turn, moves shade roll assembly 36 relative to side members 16 and 18. No rotational force is applied to tube 37, as both motor 56 and bushing 98 rotate independently of shaft 82.

When shade roll assembly 36 is in the shade member tensioning orientation shown in FIG. 4, shaft 82 is moved toward slide channel structure 72. Tabs 108 do not engage roll position motor 58 which allows shaft 82 to rotate independently of motor 58. Tabs 104 engage motor 56, specifically a rotatable assembly (e.g., a rotor—not shown) of motor 56. In the exemplary embodiment, tabs 106 are elongated so that shaft 82 is rotationally coupled to gear 91 in both the roll drive orientation (shown in FIG. 3) and the shade member tensioning orientation (shown in FIG. 4). In addition, trace member 100 includes slots (not shown) that receive tabs 106 when shaft 82 is moved toward motor 58. An end 121 of shaft 82 is positioned in one of apertures 122 defined in slide channel structure 72. Shaft 82 is prevented from moving in the direction of arrow A (shown in FIG. 2) when end 121 is positioned within aperture 122. Shaft 82 is also prevented from rotating because it is rotationally coupled to gear 91. Accordingly, motor 56 rotates tube 37 in-place.

Control unit 62 transmits power and/or control signals to motors 56 and 58, and to solenoid 88 via transmission members 64 and 66, and 68 and 70, that extend from control unit 62 to electrical connectors 110 and 112, and 116 and 118, respectively. Connectors 110 and 112 are supported by an insulating member 114 oriented within power channel structure 74. Similarly, connectors 116 and 118 are supported by an insulating member 120 oriented within power channel structure 78. In the exemplary embodiment, connectors 110 and 112, and 116 and 118, extend substantially from respective first ends 20, 28 to respective second ends 24, 32 of side members 16 and 18 (all shown in FIG. 2). In the exemplary embodiment, electrical trace member 100 is rotationally coupled to shaft 82 and electrically coupled to connectors 116 and 118 for transmitting power and/or control signals to motor 58 and/or to solenoid 88. Similarly, electrical trace member 84 is rotationally coupled to shaft 82 and electrically coupled to connectors 110 and 112 for transmitting power and/or control signals to motor 56 and/or to solenoid 88.

In the exemplary embodiment, shade roll assembly 38 is substantially identical to shade roll assembly 36. In an alternative embodiment, shade roll assembly 38 may have any suitable configuration that enables system 10 to function as described herein.

In the exemplary embodiment, to move shade roll assembly 36 relative to side members 16 and 18, control unit 62 transmits a control signal to solenoid 88 that removes power from coil 94. A magnetic field (not shown), previously pulling armature 92 and shaft 82 toward slide channel structure 72, is shut off. Spring member 96, previously compressed, pushes armature 92 and shaft 82 toward slide channel structure 76, as shown in FIG. 3 As shaft 82 is moved toward slide channel structure 76, tabs 108 engage motor 58, tabs 106 engage gear 91, and tabs 104 disengage from motor 56. In addition, end 121 of shaft 82 is withdrawn from aperture 122.

After shaft 82 has been moved toward slide channel structure 76, control unit 62 transmits power to roll position motor 58 to cause motor 58 to rotate, in a predetermined direction, for a predetermined number of revolutions corresponding to a predetermined position of tube 37 along rack 60. In the exemplary embodiment, the predetermined position of tube 37 corresponds to at least one of a plurality of predetermined settings for system 10, selectable by a passenger of vehicle 9 (FIG. 1) via a control interface device (not shown).

After movement of shade roll assembly 36, control unit 62 de-energizes motor 58, and energizes solenoid 88. Control unit 62 is configured to stop movement of shade roll assembly 36 in a position where end 121 of shaft 82 is aligned with one of apertures 122. Energizing coil 94 causes shaft 82 to be moved toward slide channel structure 72 and end 121 is inserted into aperture 122, which retains shade roll assembly 36 in place, for example during a subsequent tensioning operation. After shade roll assembly 36 has been secured in place following movement, further control signals transmitted by control unit 62 may cause shade tension motor 56 to rotate tube 37 to increase or decrease tension in shade member 40.

In the exemplary embodiment, system 10 enables the orientation of shade roll assemblies 36 and 38 in a plurality of predetermined positions relative to side members 16 and 18. In addition, system 10 enables a plurality of predetermined levels of tension to be applied to shade member 40, independently of the relative positions of shade roll assemblies 36 and 38. FIGS. 4-7 illustrate different orientations of system 10. More particularly, FIGS. 4-7 illustrate shade roll assemblies 36 and/or 38 in different positions relative to rack 60 (shown in FIG. 2), and/or with different levels of tension in shade member 40. Frame 11 is omitted from FIGS. 4-7 to simplify the illustrations.

For example, FIG. 4 illustrates system 10 with shade roll assemblies 36 and 38 fully separated. Shade roll assembly 36 is oriented adjacent a first end 61 of rack 60, and shade roll assembly 38 is oriented adjacent a second end 63 of rack 60. When shade roll assemblies 36 and 38 are in these positions, window 19 (shown in FIG. 1) is fully covered. A predetermined level of tension T is applied to shade member 40 such that a predetermined amount of light can pass through shade member 40.

Figure 5:
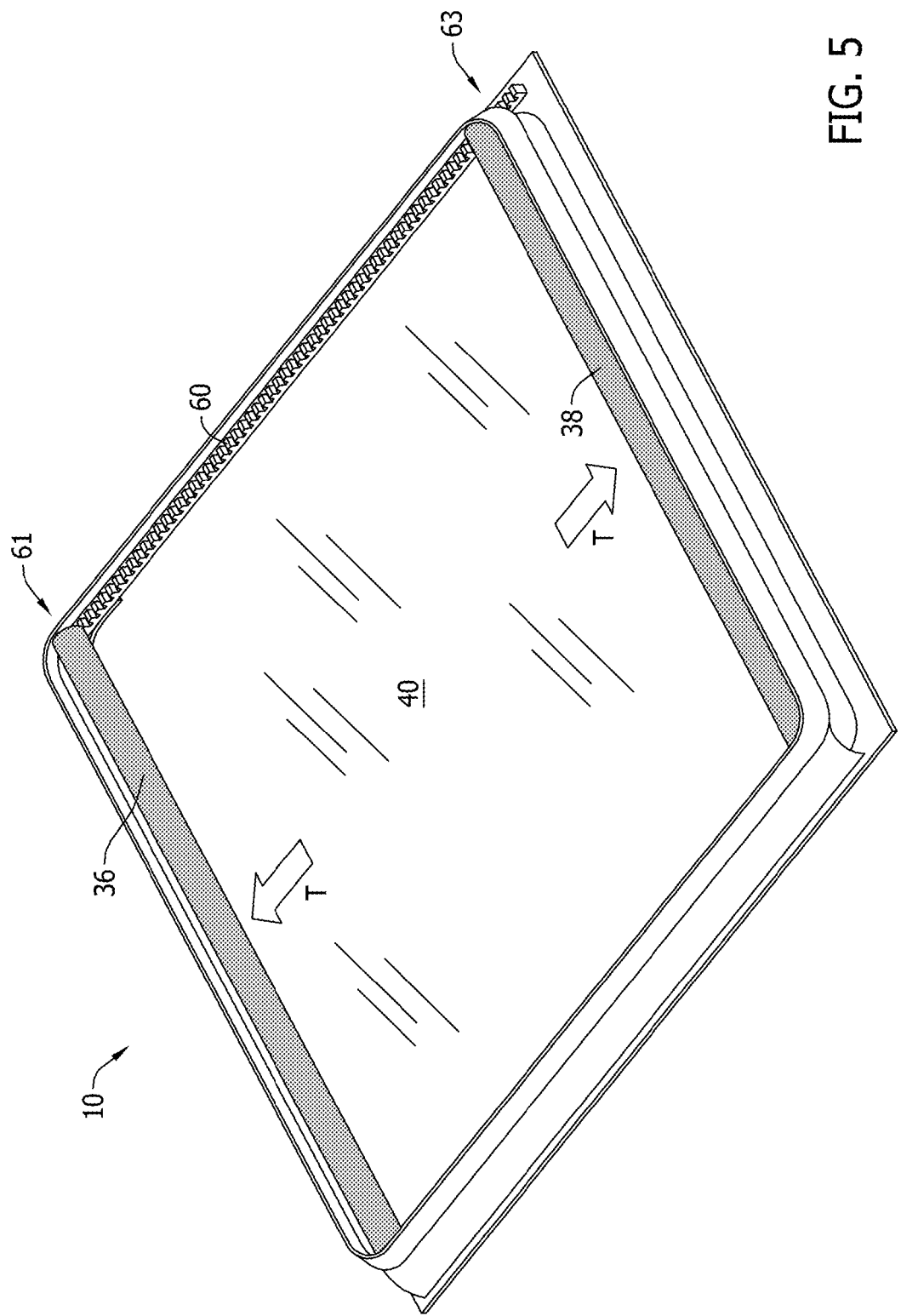
FIG. 5 is a perspective view of the shade system shown in FIG. 2, and illustrating an exemplary operational orientation.

FIG. 5 illustrates shade roll assembly 36 oriented approximately mid-way between first end 61 and second end 63 such that a portion 41 of window 19 is uncovered. A lower level of tension in shade member 40 enables a low level of light or no light to pass therethrough.

Figure 6:
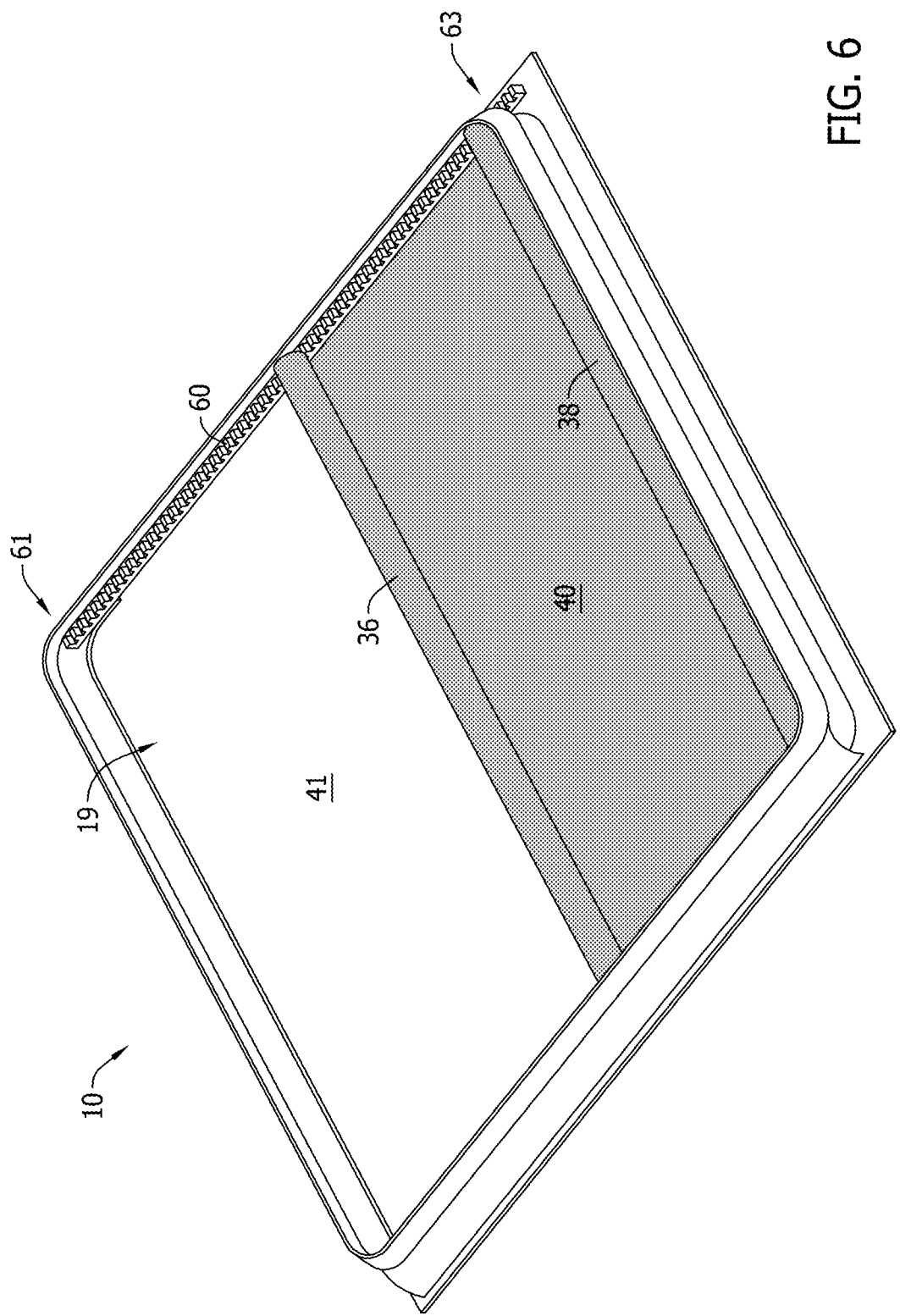
FIG. 6 is a perspective view of the shade system shown in FIG. 2, and illustrating another exemplary operational orientation.

In FIG. 6, shade roll assemblies 36 and 38 are shown in the same positions shown in FIG. 5. However, shade roll assemblies 36 and/or 38 have been rotated such that a higher level of tension T is applied to shade member 40 which facilitates a higher level of light transmission. Portion 41 of window 19 is also uncovered.

Figure 7:
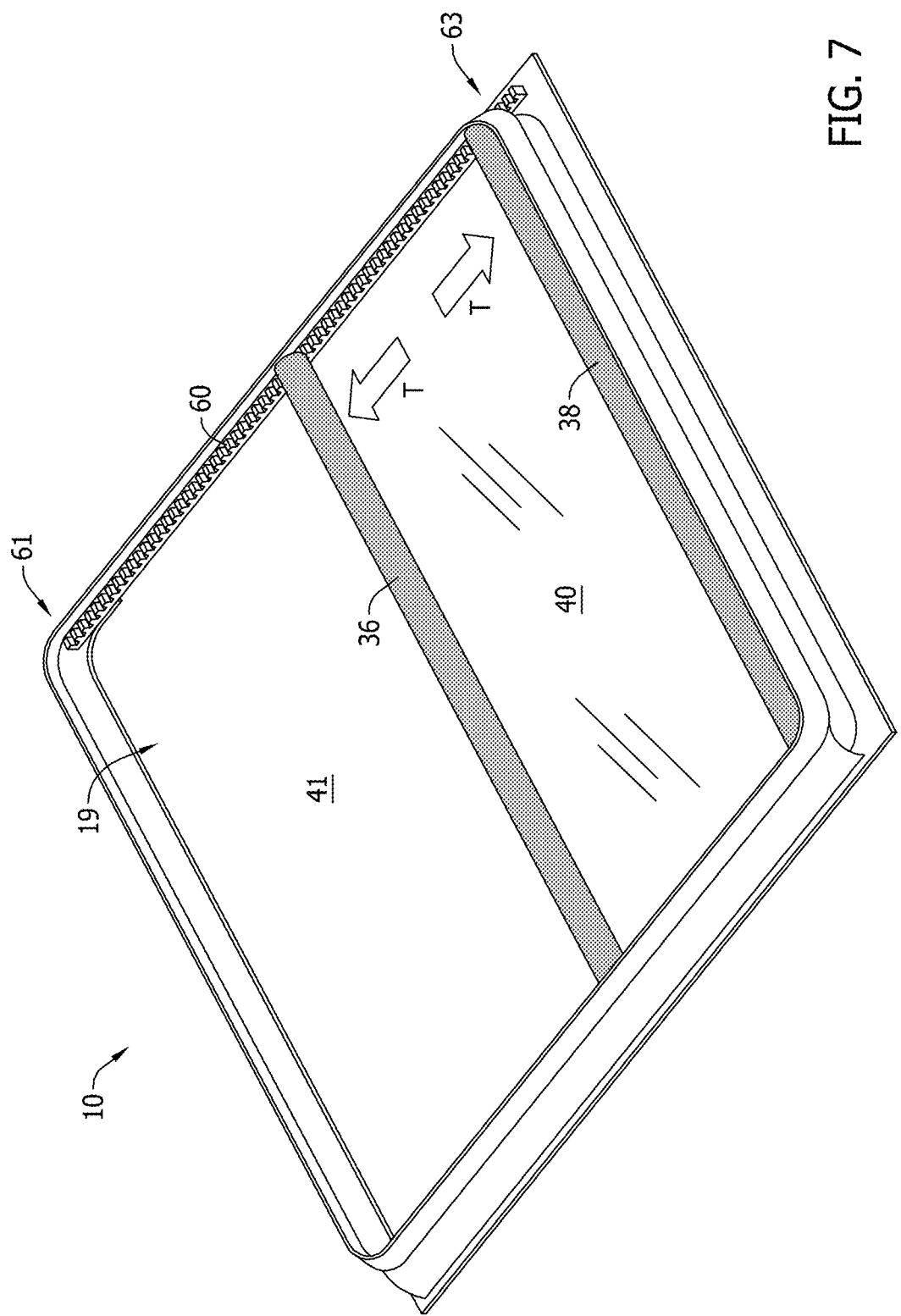
FIG. 7 is a perspective view of the shade system shown in FIG. 2, and illustrating yet another exemplary operational orientation.

In FIG. 7, a maximum amount of window 19 is exposed. Shade roll assemblies 36 and 38 are oriented approximately mid-way between ends 61 and 63 of rack 60. In addition, shade member 40 is fully wound about shade roll assemblies 36 and 38, leaving portions 41 and 43 of window 19 uncovered. The orientations of system 10 shown in FIGS. 4-7 are examples only. In alternative embodiments, system 10 can provide other orientations of shade roll assemblies 36 and/or 38, and/or levels of tension in shade member 40 as desired to enable system 10 to function as described herein.

The variable light transmission shade systems described herein overcome at least some of the limitations of known vehicle shade systems by providing at least one shade roll assembly that supports a shade member, wherein a light permeability of the shade member varies with an amount of tension applied to the shade member. The at least one shade roll assembly can move along two side members of a frame to wind or unwind the shade member, and then rotate in-place to increase or decrease the amount of tension applied to the shade member. The shade systems described herein also provide at least two shade roll assemblies that support a shade member. The at least two shade roll assemblies are movable independently of each other and are configurable in a plurality of possible orientations that enable a plurality of potential light transmitting and/or light blocking configurations. The systems described herein also enable the selectively variable transmission of light through a shade member when the shade roll assemblies are maintained in a constant orientation relative to each other. The systems described herein also enable the shade system to occupy a smaller envelope for a given window size than is possible as compared to at least some known shade systems. The shade systems described herein also facilitate reducing noise and vibration produced during operation by eliminating sliding components in favor of rolling components.

Exemplary embodiments of a variable light transmission shade system and method of assembling the same are described above in detail. The systems and methods are not limited to the specific embodiments described herein, but rather, components of the systems and/or steps of the methods may be utilized independently and separately from other components and/or steps described herein. For example, the systems may also be used in combination with other manufacturing systems and methods, and is not limited to practice with only the manufacturing systems and methods as described herein. Rather, an exemplary embodiment can be implemented and utilized in connection with many other shade system applications in addition to the vehicle shade system applications described herein, such as, but not limited to, architectural applications such as building window shade systems.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shade system comprising:
a frame coupleable adjacent to a window, said frame including first and second side members;
at least one shade roll assembly coupled to said frame and selectively movable along said first and second side members, said at least one shade roll assembly comprising:
a cylindrical tube;
a roll position motor slideably coupled to said frame and configured to move said cylindrical tube along said first and second side members; and
a shade tension motor coupled to said tube for selective in-place rotation of said at least one shade roll assembly; and
a shade member coupled to said at least one shade roll assembly and selectively variably permeable to light.

2. The shade system in accordance with claim 1, wherein said at least one shade roll assembly comprises a shaft selectively coupleable to said roll position motor and to said shade tension motor, such that when said roll position motor is coupled to said shaft said shade tension motor is uncoupled from said shaft and when said shade tension motor is coupled to said shaft said roll position motor is uncoupled from said shaft.

3. The shade system in accordance with claim 2, wherein said at least one shade roll assembly comprises a gear selectively coupleable to said roll position motor via said shaft.

4. The shade system in accordance with claim 3, wherein said system comprises a rack coupled to said frame and engaged with said gear.

5. The shade system in accordance with claim 2, wherein said at least one shade roll assembly comprises a solenoid oriented within said tube and coupled to said shaft such that when said solenoid is energized, said shaft is moved in a first direction to couple said shaft to said shade tension motor, and when said solenoid is de-energized, said shaft is moved in a second direction opposite the first direction to couple said shaft to said roll position motor.

6. The shade system in accordance with claim 1, wherein said shade member is fabricated from a material that exhibits a first level of light permeability when under a first amount of tension and exhibits at least a second, substantially different level of light permeability when under at least a second amount of tension.

7. The shade system in accordance with claim 1, wherein at least one of said first and second side members comprises:
    a slide channel structure slideably coupled to at least one of said at least one shade roll assembly; and
    a power channel structure electrically coupled to at least one of said at least one shade roll assembly.

8. The shade system in accordance with claim 7, wherein said at least one of said first and second side members comprises:
    an insulating member oriented within said power channel structure; and
    at least one electrical connector coupled to said insulating member.

9. The shade system in accordance with claim 1, wherein said at least one shade roll assembly comprises a first shade roll assembly and a second shade roll assembly each selectively movable along said first and second side members independently of each other.

10. The shade system in accordance with claim 9, wherein said first shade roll assembly and said second shade roll assembly each are coupled to said frame for rotation relative to said frame independently of each other.

11. A method for shading a window, said method comprising:
    selectively moving at least one of a first and a second shade roll assembly from a first position to a second position along first and second sides of a frame coupled adjacent to the window, wherein the first and second shade roll assemblies are coupled to opposed respective first and second ends of a shade member and wherein the first and second shade roll assemblies are movable independently of each other, wherein the first shade roll assembly includes a tube supported on a shaft, and wherein selectively moving at least one of the first and the second shade roll assemblies comprises shifting the shaft laterally relative to the frame to disengage an end of the shaft from an aperture oriented in the frame to enable movement of the first shade roll assembly along the first and second sides of the frame; and
    selectively applying an amount of tension to the shade member, wherein the shade member is variably permeable to light depending on the amount of tension on the shade member.

12. The method in accordance with claim 11, wherein shifting the shaft laterally comprises one of energizing a solenoid that couples the tube to the shaft and de-energizing the solenoid.

13. The method in accordance with claim 11, wherein selectively moving at least one of the first and second shade roll assemblies comprises:
    rotationally coupling the shaft to a roll position motor coupled to the tube upon lateral shifting of the shaft, wherein the roll position motor is coupled to a gear engaged with one of the sides of the frame; and
    energizing the roll position motor to move the first shade roll assembly along the sides of the frame, such that the first shade roll assembly is oriented a predetermined distance from the second shade roll assembly.

14. The method in accordance with claim 11, said method comprising moving each of the first and second shade roll assemblies from first positions to second positions along the first and second sides of the frame such that the first and second shade roll assemblies are oriented a predetermined distance from each other.

15. The method in accordance with claim 11, wherein selectively applying a first level of tension to the shade member comprises rotating a tube in one of the first and second shade roll assemblies, wherein the tube is secured to one of the ends of the shade member, while maintaining the tube in-place relative to the frame, and wherein rotation of the tube in a first direction increases tension in the shade member and wherein rotation of the tube in a second direction decreases tension in the shade member.

16. The method in accordance with claim 15, wherein rotating a tube in one of the first and second shade roll assemblies comprises shifting a shaft coupled to the tube laterally relative to the frame to engage an end of the shaft with an aperture defined within the frame to retain the tube in place relative to the frame during rotation of the tube.

17. The method in accordance with claim 16, wherein rotating a tube in one of the first and second shade roll assemblies comprises:
    rotationally coupling the shaft to a shade tension motor coupled to the tube upon lateral shifting of the shaft; and
    energizing the shade tension motor to rotate the tube to change the amount of tension in the shade member.

18. The method in accordance with claim 11, said method comprising actuating a control unit coupled to the first and second shade roll assemblies to select at least one predetermined orientation of the first and second shade roll assemblies relative to the frame and a predetermined level of tension in the shade member.

* * * * *